United States Patent
Batni et al.

(10) Patent No.: US 8,051,171 B2
(45) Date of Patent: Nov. 1, 2011

(54) CONTROL SERVER THAT MANAGES RESOURCE SERVERS FOR SELECTED BALANCE OF LOAD

(75) Inventors: Ramachendra P. Batni, Phoenix, AZ (US); Ranjan Sharma, New Albany, OH (US)

(73) Assignee: Alcatel Lucent, Paris (FR)

( * ) Notice: Subject to any disclaimer, the term of this patent is extended or adjusted under 35 U.S.C. 154(b) by 1085 days.

(21) Appl. No.: 11/171,077

(22) Filed: Jun. 30, 2005

(65) Prior Publication Data

US 2006/0069780 A1  Mar. 30, 2006

(51) Int. Cl.
*G06F 15/173* (2006.01)
*G06F 9/46* (2006.01)

(52) U.S. Cl. ........ 709/226; 709/223; 709/224; 709/225; 718/104; 718/105

(58) Field of Classification Search .................. 709/207, 709/226, 223, 224, 225; 718/104, 105
See application file for complete search history.

(56) References Cited

U.S. PATENT DOCUMENTS

| | | | | |
|---|---|---|---|---|
| 6,223,206 | B1 * | 4/2001 | Dan et al. | 718/105 |
| 7,062,556 | B1 * | 6/2006 | Chen et al. | 709/226 |
| 2002/0062249 | A1 * | 5/2002 | Iannacci | 705/14 |
| 2003/0079018 | A1 * | 4/2003 | Lolayekar et al. | 709/226 |
| 2003/0220998 | A1 * | 11/2003 | Jennings et al. | 709/224 |
| 2004/0066925 | A1 * | 4/2004 | Rosera et al. | 379/207.02 |
| 2005/0102676 | A1 * | 5/2005 | Forrester | 718/105 |

* cited by examiner

*Primary Examiner* — Ranodhi Serrao
*Assistant Examiner* — Farrukh Hussain
(74) *Attorney, Agent, or Firm* — Carmen Patti Law Group, LLC

(57) ABSTRACT

A control server of an apparatus in one example manages a plurality of resource servers that are allocated to handle a load. The control server receives from a first resource server, of the plurality of resource servers, a first status message that comprises a first indicator of a relative availability of the first resource server. The control server receives from a second resource server, of the plurality of resource servers, a second status message that comprises a second indicator of a relative availability of the second resource server. The control server employs a comparison of the first indicator of the relative availability of the first resource server with the second indicator of the relative availability of the second resource server to promote a selected balance of the load between two or more of the plurality of resource servers.

17 Claims, 3 Drawing Sheets

| | THRESHOLDS | | | | |
|---|---|---|---|---|---|
| | NL | OL1 | OL2 | OL3 | OL4 |
| RS1 | 400 | 450 | 500 | 550 | N/A |
| RS2 | 275 | 325 | 380 | 420 | N/A |
| RS3 | 650 | 850 | 1050 | 1250 | N/A |
| RS4 | 400 | 450 | 500 | 550 | N/A |

| OPERATIONAL MODE INDICATORS AND THRESHOLD INDICATORS OVER TIME | | | |
|---|---|---|---|
| | T1 | T2 | T3 |
| RS1 | OL1, +40 | OL1, +10 | NL, +20 |
| RS2 | OL2, +5 | OL3, +20 | OL4, +0 |
| RS3 | OL1, +25 | OL1, +30 | OL1, +15 |
| RS4 | NL, +10 | OL1, +20 | OL2, +20 |

| DYNAMIC RANKED LIST OVER TIME | | |
|---|---|---|
| T1 | T2 | T3 |
| RS4 | RS3 | RS1 |
| RS1 | RS4 | RS3 |
| RS3 | RS1 | RS4 |
| RS2 | RS2 | RS2 |

CONTROL SERVER THAT MANAGES RESOURCE SERVERS FOR SELECTED BALANCE OF LOAD

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"SCHEDULED DETERMINATION OF NETWORK RESOURCE AVAILABILITY," by Ramachendra P. Batni, Chen Fan, Ranjan Sharma, and Yu Jun Zhu, Ser. No. 10/954,573, filed Sep. 30, 2004.

"APPLICATION LOAD LEVEL DETERMINATION," by Ramachendra P. Batni, John R. Beasley, Robert Brunnetti, Brian P. Davis, Chen Fan, Nickolas Landsberg, and Ranjan Sharma, Ser. No. 11/173,412, co-filed herewith.

TECHNICAL FIELD

The invention relates generally to control and resource servers and more particularly to load balancing among resource servers.

BACKGROUND

Distributed configurations of servers in one example comprise a control server and a plurality of resource servers that are allocated to handle a load, for example, processing of incoming calls. To prevent a single resource server from becoming overloaded, the control server performs load balancing to distribute the load among the plurality of resource servers. Known methods for load balancing comprise a statically weighted distribution and round-robin distribution.

When the control server employs the statically weighted distribution, a predetermined portion of the load is distributed to each resource server. For example, control server distributes forty percent of the load to a first resource server and sixty percent of the load to a second resource server. When the control server employs the round-robin distribution, the control server alternates between the first and second resource servers for distribution of the load. However, these load balancing methods do not take the load on the resource servers into account. If the first resource server becomes overloaded while the second server is operating at a normal level, the control server will still distribute a portion of the load to the first server. As the first resource server becomes further overloaded, a quality of service level provided by the distributed configuration is reduced.

Thus, a need exists for load balancing based on resource server loads.

SUMMARY

A control server manages a plurality of resource servers that are allocated to handle a load. The control server employs a comparison of indicators of relative availability from the resource servers to promote a selected balance of the load between the resource servers.

In one embodiment, there is provided an apparatus comprising a control server that manages a plurality of resource servers that are allocated to handle a load. The control server receives from a first resource server, of the plurality of resource servers, a first status message that comprises a first indicator of a relative availability of the first resource server. The control server receives from a second resource server, of the plurality of resource servers, a second status message that comprises a second indicator of a relative availability of the second resource server. The control server employs a comparison of the first indicator of the relative availability of the first resource server with the second indicator of the relative availability of the second resource server to promote a selected balance of the load between two or more of the plurality of resource servers.

In another embodiment, there is provided a method for managing the plurality of resource servers. A first indicator is received from a first resource server of a plurality of resource servers that are allocated to handle a load. The first indicator comprises a first indicator of a relative availability of the first resource server. A second indicator is received from a second resource server of the plurality of resource servers that are allocated to handle the load. The second indicator comprises a second indicator of a relative availability of the second resource server. A ranked list of the plurality of resource servers is updated based on the first indicator of relative availability of the first resource server and the second indicator of relative availability of the second resource server.

In yet another embodiment, there is provided an article comprising one or more computer-readable non-transitory media. The article includes means in the one or more media for receiving, from a first resource server of a plurality of resource servers that are allocated to handle a load, a first indicator of a relative availability of the first resource server. The article includes means in the one or more media for receiving, from a second resource server of the plurality of resource servers that are allocated to handle the load, a second indicator of a relative availability of the second resource server. The article includes means in the one or more media for updating a ranked list of the plurality of resource servers based on the first indicator of relative availability of the first resource server and the second indicator of relative availability of the second resource server.

DESCRIPTION OF THE DRAWINGS

Features of exemplary implementations of the invention will become apparent from the description, the claims, and the accompanying drawings in which:

FIG. 2 is a representation of one exemplary table of thresholds for the plurality of resource servers of FIG. 1.

FIG. 3 is a representation of one exemplary table of operational mode indicators and threshold indicators over time for the plurality of resource servers of FIG. 1.

FIG. 4 is a representation of one exemplary table of a dynamic ranked list of the plurality of resource servers of FIG. 1 over time.

DETAILED DESCRIPTION

Figure 1:
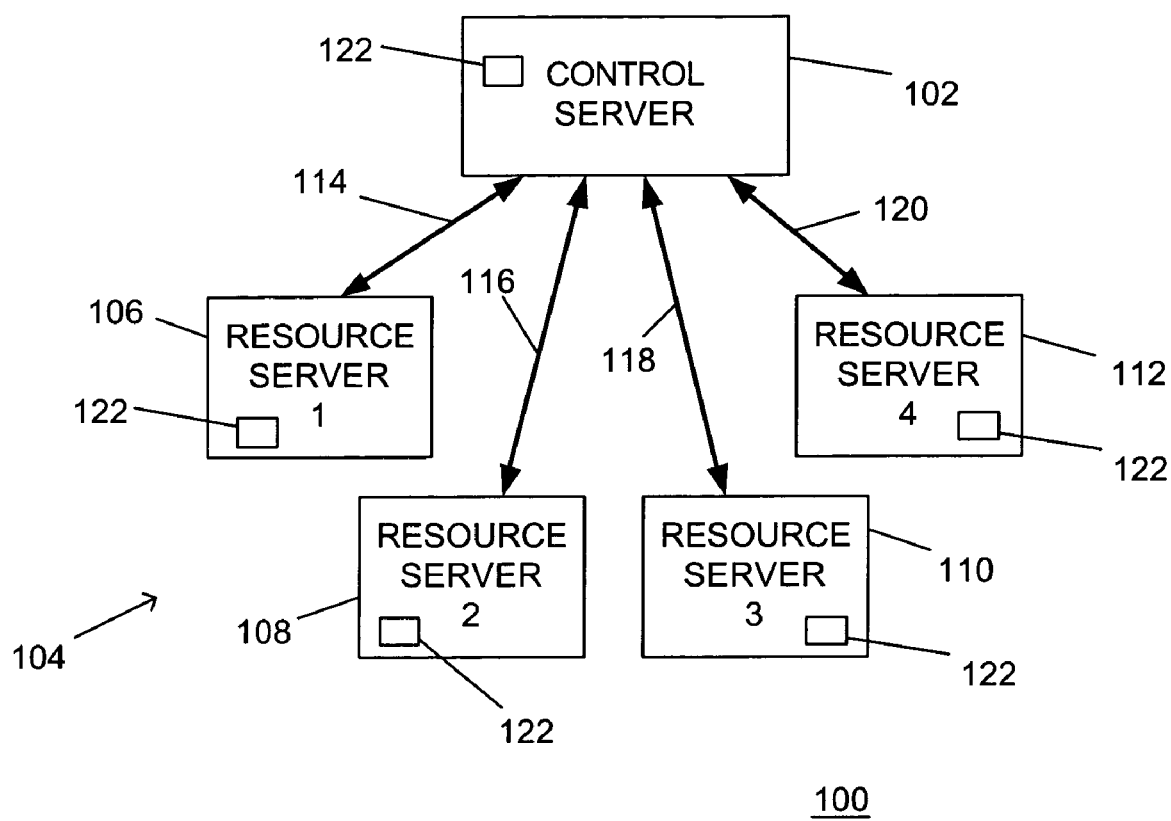
FIG. 1 is a representation of one implementation of an apparatus that comprises one or more control servers and a plurality of resource servers.

Turning to FIG. 1, an apparatus 100 in one example comprises a control server 102 and a plurality of resource servers 104, for example, resource servers 106, 108, 110 and 112. The plurality of resource servers 104 are communicatively coupled with the control server 102. For example, the resource servers 106, 108, 110 and 112 are communicatively coupled with the control server 102 via communication paths 114, 116, 118 and 120, respectively. The control server 102 and the plurality of resource servers 104 employ one or more communication protocols to exchange messages. Exemplary protocols comprise transmission control protocol/internet protocol ("TCP/IP"), simple object access protocol ("SOAP"), extensible markup language ("XML"), and lightweight directory access protocol ("LDAP"). In one example, the control server 102 employs a single protocol for all communications with the plurality of resource servers 104. In another example, the control server 102 employs a plurality of communication protocols to exchange messages with the plurality of resource servers 104.

The control server 102 in one example comprises a call controller of a cellular communication network. The plurality of resource servers 104 in one example comprise application servers of the cellular communication network. One or more of the control server 102 and one or more of the plurality of resource servers 104 in one example comprise one or more instances of a recordable data storage medium 122, as described herein. In one example, a plurality of control servers 102 share one or more of the plurality of resource servers 104. In a further example, the plurality of control servers 102 are communicatively coupled to share information about the plurality of resource servers 104, as will be appreciated by those skilled in the art.

The plurality of resource servers 104 are allocated to handle a load, for example, a call processing load. The call processing load in one example comprises a ringback tone service and/or voice mail service. The control server 102 in one example manages distribution of the load among the plurality of resource servers 104. For example, the control server 102 distributes the load among the plurality of resource servers 104 to promote a selected balance of the load between two or more of the plurality of resource servers 104.

The control server 102 in one example employs a dynamic ranked list (FIG. 4) of the plurality of resource servers 104 to distribute the load among the plurality of resource servers 104, as described herein. The control server 102 updates the dynamic ranked list on a predetermined schedule and/or as needed. In another example, the control server 102 employs an unordered list (FIG. 3) of load levels of the plurality of resource servers 104. For example, the control server 102 compares entries in the unordered list before distributing an incoming call to one of the plurality of resource servers 104.

The plurality of resource servers 104 comprise one or more resources for handling the load. Exemplary resources comprise processors, memory, and communication ports. A load level indicates a size of the load handled by the plurality of resource servers 104. Each resource server of the plurality of resource servers 104 is designed to handle a load level up to a predetermined resource threshold with a predetermined quality of service level. For example, if the load level of the resource server 106 is below the predetermined resource threshold, a quality of service level provided by the resource server 106 is generally better than or equal to the predetermined quality of service level. As the load level of the resource server 106 increases and exceeds the predetermined resource threshold, the resource server 106 is overloaded and the quality of service level is reduced. For example, a call setup time for the ringback tone service increases or a voice mail system is unavailable.

When the resource server 106 is overloaded, the resource server 106 in one example performs one or more procedures to promote a reduction of the load level, increase the quality of service level, and/or stabilize the resource server 106. For example, the resource server 106 begins "call gapping" and/or "call throttling". The plurality of resource servers 104 in one example comprises a plurality of operational modes that correspond to different levels of the procedures, for example, progressively higher levels of call gapping. The resource server 106 in one example compares a current load level of the resource server 106 with a plurality of predetermined load thresholds that correspond to the plurality of operational modes. The resource server 106 selects an operational mode that corresponds to the current load level. The resource server 106 in one example changes the plurality of predetermined load thresholds based on a change in one or more available resources of the resource server 106.

Turning to FIG. 2, table 202 comprises a plurality of predetermined load thresholds for the plurality of resource servers 104. The plurality of predetermined load thresholds separate the plurality of operational modes. The plurality of operational modes in one example comprise a normal mode and one or more overload modes. The normal mode and one or more overload modes in one example are referred to by a plurality of operational mode indicators of a predetermined ranked list, for example, "NL", "OL1 ", "OL2 ", "OL3 " and "OL4 ", respectively. For example, OL4 corresponds to a highest overload mode and NL corresponds to a normal mode, below normal mode, and/or no overload condition.

The plurality of predetermined load thresholds in one example comprise "ceilings" for one or more of the plurality of operational modes. For example, the predetermined load thresholds indicate a maximum load level for a corresponding operational mode. Exemplary load levels comprise processor usage of the processor 106, memory usage of the memory modules 108, usage and/or communication throughput of the communication ports 110, a number of calls in progress ("CIP"), or combinations thereof. The predetermined load thresholds in one example are based on engineered limits for the control server 102 and the plurality of resource servers 104, as will be appreciated by those skilled in the art.

The resource server 106 comprises a maximum load level of "400" for the normal mode NL, a maximum load level of "450" for the overload mode OL1, a maximum load level of "500" for the overload mode OL2, and a maximum load level of "550" for the overload mode OL3. The overload mode OL4 comprises a maximum overload mode and does not have a corresponding load threshold when the predetermined load thresholds comprise ceilings. In alternative embodiments, the predetermined load thresholds comprise "floors" for the plurality of operational modes or ranges of thresholds that separate the plurality of operational modes, as will be appreciated by those skilled in the art.

The operational mode indicators for the resource server 106 ("RS1"), the resource server 108 ("RS2"), the resource server 110 ("RS3") and the resource server 112 ("RS4") comprise same operational mode indicators. The predetermined load thresholds for two or more of the plurality of resource servers 104 in one example comprise same thresholds. For example, where the resource server 106 and the resource server 112 comprise resource servers with same load capacities, the predetermined load thresholds of the resource server 106 and the resource server 112 are the same. In another example, the predetermined load thresholds for two or more of the plurality of resource servers 104 comprise different thresholds. For example, where the resources servers 106 and 108 comprise resource servers with different load capacities, the predetermined load thresholds of the resource server 106 and the resource server 112 are different. Since the operational mode indicators for the plurality of resource servers 104 are the same but the predetermined load thresholds may be different, the operational mode indicators comprise an indicator of relative availability of the plurality of resource servers 104, as will be appreciated by those skilled in the art.

One or more of the plurality of resource servers 104 in one example send a status message to the control server 102 over the communication paths 114, 116, 118 and/or 120. The status message comprises an indicator of relative availability of the plurality of resource servers, for example, the operational mode indicator. In a further example, the status message comprises a threshold indicator that indicates a load difference between the operational mode indicator and a next higher operational mode indicator. For example, where the resource server 106 comprises a current load of "420" calls, the resource server 106 comprises an operational mode indicator of "OL1 ". The next higher operational mode indicator is "OL2" and thus the load difference between the operational mode indicator and the next higher operational mode indicator is "+30". For example, the resource server 106 is currently in the OL1 overload mode and will move to the OL2 overload mode after receiving thirty additional calls.

The plurality of resource servers 104 in one example send a plurality of instances of the status message to the control server 102. The control server 102 in one example employs the operational mode indicators and/or the threshold indicators to manage the distribution of the load among the plurality of resource servers 104. The resource servers 106, 108, 110 and 112 in one example send the plurality of status messages upon predetermined events, for example, a change in load level, a change in available resources, and/or an expiration of a timer. The plurality of resource servers 104 in one example send instances of the status message on a predetermined schedule, for example, upon expiration of a periodic timer. For example, the resource server 106 sends an instance of the status message to the control server 102 every ten seconds. The plurality of resource servers 104 in one example send the instances of the status message on different schedules. In another example, the plurality of resource servers 104 send an instance of the status message upon a change in the operational threshold indicator or upon receipt of a status query message from the control server 102. For example, the resource server 106 sends a status message to the control server 102 after a sudden change from the normal mode "NL" to the overload mode "OL2".

The plurality of resource servers 104 in one example send the plurality of status messages upon multiple predetermined events. For example, the resource server 106 sends the status message on a predetermined schedule and also when a change in load level occurs. The resource server 106 in one example resets the timer for the predetermined schedule upon sending a status message for the change in load level. For example, the resource server 106 employs a ten second timer for a predetermined schedule of status messages. The resource server 106 sends a status message to the control server 102 at a time t=0, t=10, t=20, etc. If at time t=22, the resource server 106 changes from a normal load "NL" to an overload mode "OL1 ", the resource server 106 sends a status message to the control server 102, which resets the timer for the predetermined schedule. So, the resource server 106 will send subsequent status messages on the predetermined schedule at time t=32, t=42, etc.

Turning to FIGS. 3 and 4, table 302 comprises operational mode indicators and threshold indicators for the resource servers 106, 108, 110 and 112 at times "T1", "T2" and "T3". Table 402 comprises instances 404, 406 and 408 of the dynamic ranked list of the plurality of resource servers 104. The control server 102 updates the dynamic ranked list of the plurality of resource servers 104 based on the status messages from the plurality of resource servers 104. For example, the control server 102 receives four instances of the status messages from each of the resource servers 106, 108, 110 and 112. The control server 102 in one example updates the dynamic ranked list based on a most recently received instance of the status messages from the resource servers 106, 108, 110 and 112. In one example, the control server 102 updates the dynamic ranked list immediately upon receipt of a status message. In another example, the control server 102 updates the ranked list on a predetermined schedule, for example, every twenty seconds. In one example, the recordable data storage medium 122 of the control server 102 comprises means for receiving the status messages from the resource servers, means for updating the dynamic ranked list, and means for distributing the load.

Figure 5:
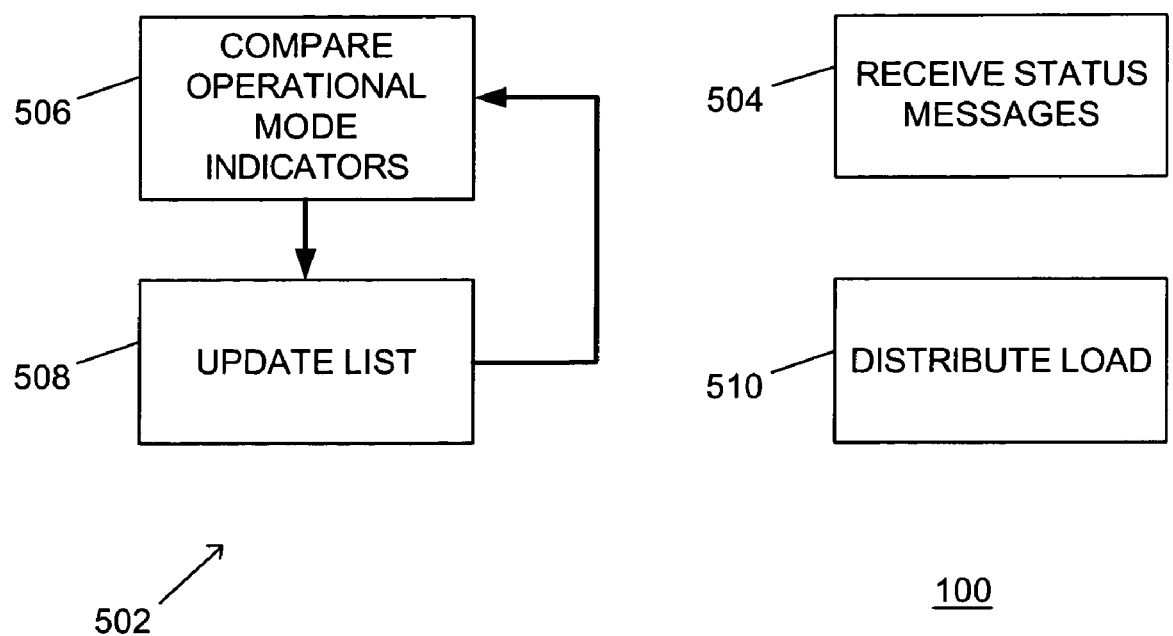
FIG. 5 is a representation of one exemplary logic flow for the control server of the apparatus of FIG. 1.

An illustrative description of an exemplary operation of the apparatus 100 is presented, for explanatory purposes. Turning to FIG. 5 and referring to FIGS. 3 and 4, the control server 102 in one example updates the dynamic ranked list based on logic flow 502. The control server 102 receives (STEP 504) a plurality of instances of the status messages from the resource servers 106, 108, 110 and 112 over a time period that comprises times T1, T2 and T3. The resource servers 106, 108, 110 and 112 in one example send the plurality of status messages upon the predetermined events. The control server 102 in one example employs a first software process or software thread to receive the plurality of instances of the status messages, as will be appreciated by those skilled in the art.

At time T1, the control server 102 in one example performs (STEP 506) a first comparison of the operational mode indicators from the resource servers 106, 108, 110 and 112. In a further example, the control server 102 performs a comparison of the threshold indicators from the resources servers 106, 108, 110 and 112. After the comparisons, the control server 102 updates (STEP 508) the dynamic ranked list. The operational mode indicator for the resource server 112 is lowest of the resource servers 106, 108, 110 and 112, so the control server 102 places the resources server 112 in a first position of an instance 404 of the dynamic ranked list. The operational mode indicators for the resource servers 106 and 110 are the same. The control server 102 performs a comparison of the threshold indicators of the resource servers 106 and 110. The load difference of the resource server 106, "40", is greater than the load difference of the resource server 110, "25". So, the control server 102 places the resource server 106 in a second position of the instance 404 of the dynamic ranked list and the resource server 110 in a third position. Since the resource server 108 comprises a highest operational mode indicator at time T1, the control server 102 places the resource server 108 in a fourth position in the instance 404 of the dynamic ranked list.

At time T2, the control server 102 performs (STEP 506) a second comparison of the operational mode indicators from the resource servers 106, 108, 110 and 112. After the second comparison, the control server 102 updates (STEP 508) the dynamic ranked list. In an instance 406 of the dynamic ranked list, the control server 102 promotes the resource server 110 to the first position, demotes the resources server 112 to the second position, and demotes the resource server 106 to the third position. The control server 102 places the resource server 108 in the fourth position of the instance 406 of the dynamic ranked list. In one example, the recordable data storage medium 122 of the control server 102 comprises means for performing the comparisons and promoting or demoting the resource servers.

At time T3, the control server 102 performs (STEP 506) a third comparison of the operational mode indicators from the resource servers 106, 108, 110 and 112. After the third comparison, the control server 102 updates (STEP 508) the dynamic ranked list. In an instance 408 of the dynamic ranked list, the control server 102 promotes the resource server 106 to the first position, demotes the resource server 110 to the second position, and demotes the resource server 112 to the third position. The control server 102 places the resource server 108 in the fourth position of the instance 406 of the dynamic ranked list. The control server 102 in one example employs a second software process or software thread to perform the comparisons and update the dynamic ranked list. STEPS 506 and 508 in one example occur asynchronously with STEP 504, as will be appreciated by those skilled in the art.

The control server 102 in one example employs the dynamic ranked list of the plurality of resource servers 104 to distribute (STEP 510) the load, for example, incoming calls for the ringback tone service, among the plurality of resource servers 104. After the time T1, but before the time T2, the control server 102 employs the instance 404 to distribute the load among the resource servers 106, 108, 110 and 112. The control server 102 distributes new incoming calls to the first position of the instance 404 of the dynamic ranked list, i.e., the resource server 112. After the time T2, but before the time T3, the control server 102 employs the instance 406 to distribute the load. Since the resource servers 106, 110 and 112 comprise a same operational mode indicator, i.e., OL1, the control server 102 in one example employs a round-robin scheme to distribute the load among the resource servers 106, 110 and 112. In another example, the control server 102 employs a round-robin procedure and the dynamic ranked list to distribute the load. For example, the control server 102 employs the round-robin procedure on the instance 408 after the time T3 to distribute the load.

The control server 102 in one example employs a third software process or software thread to distribute the load among the plurality of resource servers 104. The first, second, and third software processes in one example run simultaneously. For example, the steps of the first, second, and third software processes occur asynchronously. In one example, the first software process (i.e., the step of receiving) provides the operational mode indicators to the second software process (i.e., the step of comparing) on a predetermined schedule. In another example, the first software process provides the operational mode indicators to the second software process upon a request from the second software process, as will be appreciated by those skilled in the art.

During a time period of high load, the control server 102 in one example distributes the load to resource servers that are in an overload mode to prevent a sudden increase in load on a single resource server. For example, where an incoming load comprises fifty incoming calls after the time T3, the resource server 106 could become excessively overloaded and unresponsive if given all fifty calls in a short period of time. So, the control server 102 in one example distributes twenty-five calls to the resource server 106, twenty calls to the resource server 110, and five calls to the resource server 112.

The control server 102 performs the comparisons (STEP 506) of the operational mode indicators received in STEP 504. The control server 102 in one example receives a plurality of instances of the status message from the resource server 106 between comparisons of the operational mode indicators. In a first example, the control server 102 stores only the most recent instance of the status message for the next comparison. For example, the control server 102 overwrites a status mode indicator for the resource server 106. In a second example, the control server 102 stores a plurality of recent instances of the status message.

Numerous alternative embodiments of the present invention exist. The control server 102 in one example performs (STEP 506) the comparison and updates (STEP 508) the dynamic ranked list for every incoming call or after a predetermined number of calls have been handled. The control server 102 in another example The plurality of resource servers 104 in one example execute a plurality of call processing applications. The operational mode indicators and threshold indicators in one example correspond to the operational modes of the call processing applications instead of the resource servers. For example, the operational mode indicators are at an application level instead of a platform level, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer readable non-transitory media. The computer-readable non-transitory media store software, firmware and/or assembly language for performing one or more portions of one or more embodiments of the invention. Examples of a computer-readable non-transitory medium for the apparatus 100 comprise the recordable data storage medium 122 of the control server 102 and the recordable data storage medium 122 of the plurality of resource servers 104. The computer-readable non-transitory medium for the apparatus 100 in one example comprise one or more of a magnetic, electrical, optical, biological, and atomic data storage medium. For example, the computer-readable non-transitory medium comprise floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
  a control server, with one or more electronic components, wherein the control server comprises a call controller of a cellular communication network configured to manage a plurality of resource servers of the cellular communication network that are allocated to handle a call load for the cellular communication network, wherein the control server is configured to receive from a first resource server, of the plurality of resource servers, one or more instances of a first status message that comprises a first indicator of a availability of the first resource server, wherein the control server is configured to receive from a second resource server, of the plurality of resource servers, one or more instances of a second status message that comprises a second indicator of a availability of the second resource server;

wherein the control server comprises a predetermined ranked list of operational mode indicators that correspond to a respective plurality of call handling operational modes for the plurality of resource servers, wherein the first and second indicators are selected from the predetermined ranked list of operational mode indicators;

wherein the plurality of call handling operational modes are separated by resource thresholds of the resource server from which the status message is sent;

wherein the control server comprises a dynamic ranked list of the plurality of resource servers and is configured to employ the dynamic ranked list to distribute the call load among the plurality of resource servers to promote a selected balance of the call load;

wherein the control server is configured to employ a comparison of the most recently received first indicator with the most recently received second indicator to update the dynamic ranked list and promote the selected balance of the call load.

2. The apparatus of claim 1 in combination with the first resource server and the second resource server;

wherein the first resource server is configured to select a first call handling operational mode from the plurality of call handling operational modes based on one or more resource levels of the first resource server, wherein the first indicator corresponds to the first call handling operational mode;

wherein the second resource server is configured to select a second call handling operational mode from the plurality of call handling operational modes based on one or more resource levels of the second resource server, wherein the second indicator corresponds to the second call handling operational mode.

3. The apparatus of claim 2, wherein the first resource server comprises a first set of resource thresholds that separate the plurality of call handling operational modes;

wherein the first resource server is configured to select the first call handling operational mode based on a comparison of the one or more resource levels of the first resource server with the first set of resource thresholds;

wherein the second resource server comprises a second set of resource thresholds that separate the plurality of call handling operational modes;

wherein the second resource server is configured to select the second call handling operational mode based on a comparison of the one or more resource levels of the second resource server with the second set of resource thresholds.

4. The apparatus of claim 3, wherein the first resource server is configured to change the first set of resource thresholds that separate the plurality of call handling operational modes to a third set of resource thresholds based on a change in one or more available resources of the first resource server;

wherein the first resource server is configured to select a third call handling operational mode from the plurality of call handling operational modes based on a comparison of the one or more resource levels of the first resource server with the third set of resource thresholds.

5. The apparatus of claim 1, wherein the predetermined ranked list of operational mode indicators comprises a normal mode indicator and a plurality of overload mode indicators;

wherein the control server is configured to distribute the call load to a resource server with a normal mode indicator before a resource server with an overload mode indicator, of the plurality of overload mode indicators, to promote the selected balance of the call load between the two or more of the plurality of resource servers.

6. The apparatus of claim 1, wherein the first indicator of availability comprises the first indicator and a first threshold indicator that indicates a call load difference between the first indicator and a next higher operational mode indicator;

wherein the second indicator of availability comprises the second indicator and a second threshold indicator that indicates a call load difference between the second indicator and a next higher operational mode indicator;

wherein the control server is configured to perform a comparison of the first threshold indicator of the first resource server with the second threshold indicator of the second resource server when the first indicator and the second indicator comprise a same operational mode indicator;

wherein if the first threshold indicator is greater than the second threshold indicator, the control server is configured to distribute the call load to the first resource server before the second resource server to promote the selected balance of the call load between the two or more of the plurality of resource servers.

7. The apparatus of claim 1 in combination with the first resource server and the second resource server;

wherein the first resource server is configured to select the first indicator of the availability of the first resource server, wherein the first resource server is configured to send the first status message that comprises the first indicator of the availability of the first resource server to the control server;

wherein the second resource server is configured to select the second indicator of the availability of the second resource server, wherein the second resource server is configured to send the second status message that comprises the second indicator of the availability of the second resource server to the control server.

8. The apparatus of claim 7 wherein the first resource server comprises one or more first call processing applications that are allocated to handle the call load;

wherein the availability of the first resource server comprises a availability of the one or more first call processing applications;

wherein the second resource server comprises one or more second call processing applications that are allocated to handle the call load;

wherein the availability of the second resource server comprises a availability of the one or more second call processing applications.

9. The apparatus of claim 7, wherein the first resource server is configured to send on a first predetermined event the first status message that comprises the first indicator of the availability of the first resource server to the control server;

wherein the second resource server is configured to send on a second predetermined event the second status message that comprises the second indicator of the availability of the second resource server to the control server.

10. The apparatus of claim 7, wherein the first predetermined event and the second predetermined event comprise one of a change in call load level, a change in available resources, or an expiration of a timer.

11. The apparatus of claim 1, wherein the plurality of call handling operational modes for call handling by the plurality of resource servers correspond to call load level reduction procedures.

12. The apparatus of claim 11, wherein the plurality of call handling operational modes for call handling by the plurality of resource servers correspond to different levels of call gapping and/or call throttling procedures.

13. A method, comprising the steps of:

receiving at a control server of a cellular communication network, from a first resource server of a plurality of resource servers that are allocated to handle a call load on the cellular communication network, one or more instances of a first status message that comprises a first indicator of a availability of the first resource server, wherein the first indicator is selected from a predetermined ranked list of operational mode indicators, wherein the predetermined ranked list of operational mode indicators corresponds to a respective plurality of call handling operational modes for the plurality of resource servers;

receiving at the control server, from a second resource server of the plurality of resource servers that are allocated to handle the call load, one or more instances of a second status message that comprises a second indicator of a availability of the second resource server, wherein the second indicator is selected from the predetermined ranked list of operational mode indicators, wherein the plurality of call handling operational modes are separated by resource thresholds of the resource server from which the status message is sent; and updating, at the control server, a dynamic ranked list of the plurality of resource servers based on a comparison of the most recently received first indicator and the most recently received second indicator;

distributing, by the control server, the call load among the plurality of resource servers based on the dynamic ranked list of the plurality of resource servers to promote a selected balance of the call load between two or more of the plurality of resource servers.

14. The method of claim 13, further comprising the step of:

performing a comparison, by the control server, of the most recently received first indicator and the most recently received second indicator.

15. The method of claim 14, wherein the step of updating the dynamic ranked list comprises the step of:

promoting, by the control server, the first resource server within the dynamic ranked list of the plurality of resource servers based on the comparison of the most recently received first indicator and the most recently received second indicator.

16. A computer-readable non-transitory medium storing instructions which, when executed by a processor, cause the processor to perform a method comprising the steps of:

receiving at a control server of a cellular communication network, from a first resource server of a plurality of resource servers that are allocated to handle a call load on the cellular communication network, one or more instances of a first status message that comprises a first indicator of a availability of the first resource server, wherein the first indicator is selected from a predetermined ranked list of operational mode indicators, wherein the predetermined ranked list of operational mode indicators corresponds to a respective plurality of call handling operational modes for the plurality of resource servers;

receiving at the control server, from a second resource server of the plurality of resource servers that are allocated to handle the call load, one or more instances of a second status message that comprises a second indicator of a availability of the second resource server, wherein the second indicator is selected from the predetermined ranked list of operational mode indicators, wherein the plurality of call handling operational modes are separated by resource thresholds of the resource server from which the status message is sent;

updating, at the control server, a dynamic ranked list of the plurality of resource servers based on a comparison of the most recently received first indicator and the most recently received second indicator; and distributing, by the control server, the call load among the plurality of resource servers based on the dynamic ranked list of the plurality of resource servers to promote a selected balance of the call load between two or more of the plurality of resource servers.

17. The computer-readable non-transitory medium of claim 16, the method further comprising the steps of:

performing, by the control server, a comparison of the most recently received first indicator and the most recently received second indicator;

wherein the step of updating the dynamic ranked list comprises the step of:

promoting, by the control server, the first resource server within the dynamic ranked list of the plurality of resource servers based on the comparison of the most recently received first indicator and the most recently received second indicator.

* * * * *